(12) United States Patent
Hamamura

(10) Patent No.: US 9,122,129 B2
(45) Date of Patent: Sep. 1, 2015

(54) IMAGE PICKUP APPARATUS, DRIVING CONTROL METHOD THEREOF, AND COMPUTER-READABLE RECORDING MEDIUM

(71) Applicant: Toshihiro Hamamura, Yokohama (JP)

(72) Inventor: Toshihiro Hamamura, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 154 days.

(21) Appl. No.: 13/679,348

(22) Filed: Nov. 16, 2012

(65) Prior Publication Data

US 2013/0128098 A1     May 23, 2013

(30) Foreign Application Priority Data

Nov. 18, 2011  (JP) .................................. 2011-253138
Oct. 17, 2012  (KR) ......................... 10-2012-0115136

(51) Int. Cl.
  *H04N 5/232* (2006.01)
  *G03B 13/24* (2006.01)
  *H04N 5/225* (2006.01)

(52) U.S. Cl.
  CPC ............... *G03B 13/24* (2013.01); *H04N 5/225* (2013.01); *H04N 5/23203* (2013.01); *H04N 5/23209* (2013.01); *H04N 5/23212* (2013.01)

(58) Field of Classification Search
  CPC ............. H04N 5/232; H04N 5/23203; H04N 5/23209; H04N 5/225
  USPC .................................................. 348/346, 345
  See application file for complete search history.

(56) References Cited

U.S. PATENT DOCUMENTS

| | | | |
|---|---|---|---|
| 6,750,914 B2* | 6/2004 | Sannoh et al. | 348/346 |
| 6,937,284 B1* | 8/2005 | Singh et al. | 348/346 |
| 2002/0039242 A1* | 4/2002 | Sasaki et al. | 359/819 |
| 2003/0174414 A1* | 9/2003 | Sasaki | 359/698 |
| 2005/0151875 A1* | 7/2005 | Idemura | 348/360 |
| 2005/0244153 A1* | 11/2005 | Kusaka | 396/79 |
| 2006/0044452 A1* | 3/2006 | Hagino | 348/345 |
| 2006/0045509 A1* | 3/2006 | Sasaki | 396/137 |
| 2007/0019940 A1* | 1/2007 | Sasaki | 396/121 |
| 2007/0212051 A1* | 9/2007 | Moriya | 396/147 |
| 2008/0278618 A1* | 11/2008 | Matsumoto et al. | 348/345 |
| 2009/0059058 A1* | 3/2009 | Okabe et al. | 348/345 |
| 2009/0096885 A1* | 4/2009 | Robinson et al. | 348/222.1 |
| 2009/0262233 A1* | 10/2009 | Nagahata et al. | 348/341 |
| 2010/0171871 A1* | 7/2010 | Ogino | 348/349 |
| 2012/0121240 A1* | 5/2012 | Ueda | 396/89 |
| 2012/0327274 A1* | 12/2012 | Taguchi et al. | 348/240.2 |
| 2013/0021516 A1* | 1/2013 | Kikuchi | 348/345 |

FOREIGN PATENT DOCUMENTS

JP      2010-160269      7/2010

* cited by examiner

*Primary Examiner* — Nicholas Giles
*Assistant Examiner* — Abdelaaziz Tissire
(74) *Attorney, Agent, or Firm* — Staas & Halsey LLP

(57) ABSTRACT

An image pickup apparatus includes an image pickup unit to photograph a subject by using a photographing device, a control unit to determine an operation mode of the image pickup apparatus, and, when the operation mode of the image pickup apparatus is a manual focusing mode, the control unit selects a focus detecting method to be applied among a plurality of focus detecting methods according to a focus operation of a user, a determination unit to determine a focus state for the subject by using the selected focus detecting method, and a user interface unit to indicate the determined focus state.

20 Claims, 16 Drawing Sheets

IMAGE PICKUP APPARATUS, DRIVING CONTROL METHOD THEREOF, AND COMPUTER-READABLE RECORDING MEDIUM

CROSS-REFERENCE TO RELATED APPLICATIONS

This application claims priority under 35 U.S.C. §119(a) from Korean Patent Application No. 10-2012-0115136 filed Oct. 17, 2012 in the Korean Intellectual Property Office and Japanese Patent Application No. 2011-253181 filed Nov. 18, 2011 in the Japan Patent Office, the disclosures of which are incorporated herein by reference in their entirety.

BACKGROUND OF THE INVENTION

1. Field of the Invention

The present general inventive concept relates to an image pickup apparatus, a driving control method thereof, and a computer-readable recording medium. More particularly, the present general inventive concept relates to an image pickup apparatus, a driving control method, and a computer-readable recording medium that can change a focus detecting method to be applied depending on a user's focus operation and can detect a focus state thereof.

2. Description of the Related Art

A digital camera refers to a camera that converts an image of a subject into electrical signals, again converts the electrical signals into digital signals, and records the digital signals on a memory device. In recent years, thanks to the development of electronic technology, development and dissemination of various types of digital cameras have been accelerated.

Such digital camera needs an operation to focus on a subject in order to properly photograph the subject. Such operation is referred to focusing. Such focusing methods may be classified into two methods. One is a manual focusing method (or a manual focusing mode) where a user directly adjusts the focus, and the other one is an automatic focusing method (or automatic focusing mode) where the digital camera automatically adjusts the focus.

A recent digital camera adopts the automatic focusing method, thereby allowing the user to more easily photograph. However, when there are a plurality of subjects, or when the user wants to photograph a subject and a glass surface is between the digital camera of the user and the subject, the automatic focusing method has a limit, and high-performance digital cameras support the manual focusing method therewith.

However, while photographing by the manual focusing method, conventional digital cameras do not provide current information about a state of the focus on a subject. Therefore, it is difficult to photograph by using the manual focusing method.

SUMMARY OF THE INVENTION

The present disclosure has been developed in order to overcome the above drawbacks and other problems associated with the conventional arrangement. Exemplary embodiments of the present general inventive concept provide an image pickup apparatus that can change a focus detecting method to be applied depending on a focus operation of a user, and can detect a focus state, a driving control method of the same, and a computer-readable recordable medium for the same.

Additional features and utilities of the present general inventive concept will be set forth in part in the description which follows and, in part, will be obvious from the description, or may be learned by practice of the general inventive concept.

Exemplary embodiments of the present general inventive concept provide an image pickup apparatus which may include an image pickup unit to photograph a subject by using a photographing device, a control unit to determine an operation mode of the image pickup apparatus, and, when the operation mode of the image pickup apparatus is a manual focusing mode, the control unit to select a focus detecting method to be applied among a plurality of focus detecting methods according to a focus operation of a user, a determination unit to determine a focus state for the subject by using the selected focus detecting method, and a user interface unit to indicate the determined focus state.

The plurality of focus detecting methods may include a wobbling operation method, and when there is no focus operation of the user or when the focus operation is less than or equal to a predetermined size, the control unit may select the wobbling operation method as the focus detecting method to be applied.

When the focus operation of the user exceeds the predetermined size, the control unit may select a manual focusing operation method as the focus operation of the user.

The determination unit may convert a driving amplitude of the wobbling operation according to an aperture value and a focus state of a lens unit, and determine the focus state for the subject.

When a zoom lens is driven, the control unit may control the determination unit so as not to determine the focus state for the subject.

When the zoom lens is driven, the control unit may control the user interface unit so as not to indicate the determined focus state.

When a focus lens is stopped, the user interface unit may indicate the determined focus state and a driving direction of the focus lens.

While the focus lens is being driven, the user interface unit may indicate the determined focus state and a validity of a driving direction of the focus lens.

The determination unit may calculate an optimal focal position according to focus information at three different positions of a focus lens, and calculate a driving direction of the focus lens to move to the calculated optimal focal position.

The image pickup apparatus may include a storage unit to store images photographed by the image pickup unit, and wherein when an image pickup command is input, the control unit may store the images photographed by the photographing device in the storage unit.

Exemplary embodiments of the present general inventive concept may also provide a driving control method of an image pickup apparatus may include determining an operation mode of the image pickup apparatus, if the operation mode of the image pickup apparatus is a manual focusing mode, selecting a focus detecting method to be applied among a plurality of focus detecting methods according to whether a focus operation of a user, determining a focus state for a subject by using the selected focus detecting method; and indicating the determined focus state.

The plurality of focus detecting methods may include a wobbling operation method, and when there is no focus operation of the user or when the focus operation is less than or equal to a predetermined size, selecting the wobbling operation method as the focus detecting method to be applied.

When the focus operation of the user exceeds the predetermined size, the selecting a focus detecting method may include selecting a manual focusing operation method according to the focus operation of the user.

The wobbling operation may convert a driving amplitude thereof according to an aperture value and a focus state of a lens unit.

The determining a focus state may include, when a zoom lens is driven, determining that the determination of the focus state is not performed.

The indicating the determined focus state may include, when the zoom lens is driven, not indicating the determined focus state.

The indicating the determined focus state may include, when the focus lens is stopped, indicating the determined focus state and a driving direction of the focus lens.

The indicating the determined focus state may include, while the focus lens is being driven, indicating the determined focus state and a validity of driving direction of the focus lens.

The determining a focus state may include calculating an optimal focal position by using focus information at three different positions of the focus lens, and calculating a driving direction of the focus lens to move to the calculated optimal focal position.

Exemplary embodiments of the present general inventive concept may also provide a non-transitory computer-readable recording medium that, when executed by a computer, performs a driving control method of an image pickup apparatus. The driving control method may include determining an operation mode of the image pickup apparatus, if the operation mode of the image pickup apparatus is a manual focusing mode, selecting a focus detecting method to be applied among a plurality of focus detecting methods according to whether a focus operation of a user, determining a focus state for a subject by using the selected focus detecting method, and indicating the determined focus state.

Exemplary embodiments of the present general inventive concept may also provide a method of displaying a focus state for a subject with a digital image capturing apparatus, the method including determining whether a manual focusing mode of the digital image capturing apparatus is selected, determining whether there is a focus operation of the user, the focus operation of the user that is less than or equal to a predetermined focus amount, or the focus operation of the user is greater than the predetermined focus amount when the manual focusing mode is selected, determining a focus state for a subject by using the determined focus operation of the user, and displaying the determined focus state.

The method may include that when there is no focus operation of the user or when the focus operation is less than or equal to the predetermined focus amount, performing a wobbling operation.

The method may include that the wobbling operation converts a driving amplitude of a focus lens of the digital capture apparatus according to an aperture value and a focus state of a lens unit.

The method may include that the displaying the determined focus state includes that while a focus lens of the digital capture apparatus is being driven, displaying the determined focus state and a validity of a driving direction of the focus lens.

The method may include that the determining a focus includes calculating an optimal focal position by using focus information at three different positions of a focus lens and calculating a driving direction of the focus lens to move to the calculated optimal focal position.

Exemplary embodiments of the present general inventive concept may also provide a digital image capture apparatus including an image capture device to capture an image of a subject, a controller to determine whether a manual focusing mode of the image capture device is selected, to determine whether there is a focus operation of the user, the focus operation of the user that is less than or equal to a predetermined focus amount, or the focus operation of the user is greater than the predetermined focus amount when the manual focusing mode is selected, and to determine a focus state for the subject by using the determined focus operation of the user, and a user interface unit to display the determined focus state.

When the controller determines that there is no focus operation of the user or when the focus operation is less than or equal to the predetermined focus amount, the controller can perform a wobbling operation.

The wobbling operation performed by the controller to convert a degree of a driving amplitude of a focus lens of the digital capture apparatus according to an aperture value and a focus state of the lens unit.

The user interface can display the determined focus state and a validity of a driving direction of the focus lens to display the determined focus state includes that the user while a focus lens of the digital capture apparatus is being driven.

The controller can calculate an optimal focal position by using focus information at three different positions of a focus lens and calculates a driving direction of the focus lens to move to the calculated optimal focal position to determine the focus state.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

Throughout the drawings, like reference numerals will be understood to refer to like parts, components and structures.

DETAILED DESCRIPTION OF THE PREFERRED EMBODIMENTS

Figure 1:
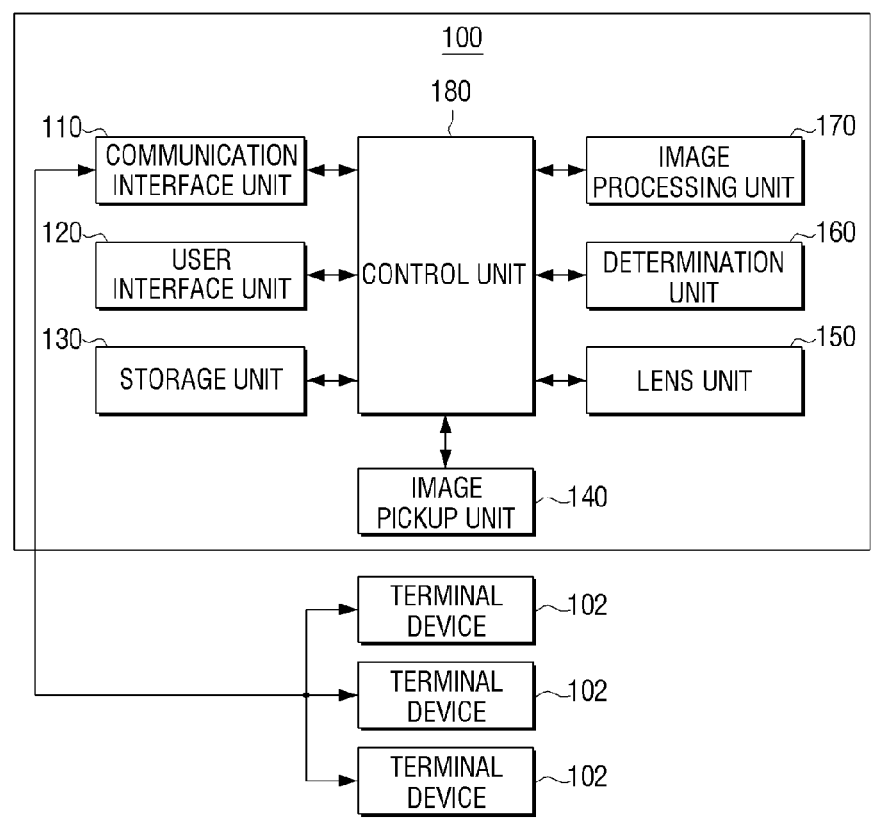
FIG. 1 is a block diagram illustrating configuration of an image pickup apparatus according to exemplary embodiments of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

FIG. 1 is a block diagram illustrating an image pickup apparatus according to exemplary embodiments of the present general inventive concept.

Referring to FIG. 1, the image pickup apparatus 100 according to exemplary embodiments of the present general inventive concept may include a communication interface unit 110, a user interface unit 120, a storage unit 130, an image pickup unit 140, a lens unit 150, a determination unit 160, an image processing unit 170, and a control unit 180. The image pickup apparatus 100 according to exemplary embodiments of the present general inventive concept may include a digital camera, a camcorder, a cell phone, a PMP, a web cam, etc.

The communication interface unit 110 may be communicatively connected to at least one terminal device 102 via a wired and/or wireless interface, and may be connected to the terminal device in a wireless or wired manner through a local area network (LAN) and the internet network as well as through a universal serial bus (USB) port, a Bluetooth module, etc.

The communication interface unit 110 transmits contents (e.g., data, image files, video files, etc.) which the image pickup apparatus 100 stores to external terminal devices 102. In detail, the communication interface unit 110 can transmit image files stored in the storage unit 130 as will be described below to the external terminal device 102 or a server. Here, the contents may include image contents, video contents, etc. that can be generated by the image pickup apparatus 100.

The user interface unit 120 has a plurality of function keys that allows a user to set or to select one or more functions supported in the image pickup apparatus 100, and can indicate and/or display information provided by the image pickup apparatus 100. The user interface unit 120 may be implemented as an apparatus such as a touch screen that can perform input and output at the same time or by combining an input device including a plurality of buttons and a display device such as a LCD (liquid crystal display) monitor, an OLED (organic light emitting diode) monitor, etc.

The user interface unit 120 receives one or more control commands, such as a live-view display command, a half-shutter command (or an automatic focusing command), a shutter command (or an image pickup command), etc., from the user.

The user interface unit 120 receives settings and/or commands related to the image pickup operation. In detail, the user interface unit 120 can receive settings such as any file format in which the user wants to save a photographed image, resolution of the photographed image, whether or not to apply image correction (e.g., blur reduction, focus adjustment, etc.), whether or not to apply a digital zoom, automatic white balance (AWB), automatic focus (AF), automatic exposure (AE), etc.

The user interface unit 120 can display the photographed images. In detail, the user interface unit 120 can display images photographed according to the image pickup command of the user, and/or can display images corrected by the image processing unit 170, which will be described later.

The user interface unit 120 can display various contents stored in the storage unit 130 according to a play command of the user received by the under interface unit 120. Here, the contents may include image contents, video contents, etc. For example, if the image pickup apparatus 100 can capture a video (i.e., capture images to form a video and store the video in the storage unit 130), the user interface unit 120 can play video contents that are pre-stored in the storage unit 130.

The user interface unit 120 can display a live-view image. That is, the user interface unit 120 can display the image being captured by the image pickup unit 140 of the image pickup apparatus 100. In detail, the user interface unit 120 can display live-view images taken by the image pickup unit 140 that will be described hereinafter based on the live-view display command of the user. Here, the live-view refers to a function that allows images taken (i.e., captured) by the image pickup unit 140 to be displayed on a user interface window of the user interface unit 120 rather than a view finder. The user interface unit 120 can display a focus state determined in the determination unit 160 that will be described hereinafter. When the user is taking an image using the view finder, a focus state determined by the determination unit 160 can be indicated on the view finder. Such an example will be explained hereinafter with reference to FIGS. 6 and 7.

The storage unit 130 stores photographed images. In detail, the storage unit 130 can store images photographed by the image pickup unit 140 that will be explained hereinafter or images that are image-processed in the image processing unit 170 that will be explained hereinafter. That is, the image pickup unit 140 captures an image of a subject and converts the captured information into digital data, which can be processed by the image processing unit 170 and/or stored in the storage unit 130.

The storage unit 130 can store a focal position, a zoom focus distance, an evaluation value of the focus state, etc. that are calculated in the determination unit 160 and control unit 180 that will be described hereinafter.

The storage unit 130 may be a storage medium within the image pickup apparatus 100 and an external storage medium, for example, a removable disk and/or memory card including a USB memory, a flash memory, etc., a storage medium connected to the image pickup apparatus, a web server through a network, etc.

The image pickup unit 140 can in succession take a plurality of images among which there are mutual displacements by using an image pickup device. In detail, the image pickup unit 140 can include an image pickup device that photoelectrically converts light entered through lenses into electric signals, and an A/D (analog-to-digital) converter that converts analog signals of the image pickup device into digital signals and outputs them. The image pickup device may include a charge coupled device (CCD) image pickup device and/or a complementary metal oxide semiconductor (CMOS) image pickup device.

The image pickup unit 140 can generate a full-frame image or a live-view image according to the operation state of the image pickup apparatus 100.

The lens unit 150 collects light of a subject to form an optical image on a photographing area. For example, the lens unit 150 may collect light from a subject and form an optical image on the image pickup unit 140 so that the image pickup unit 140 may capture the image. A detailed structure and operation of the lens unit 150 will be explained hereinafter with reference to FIG. 2.

The determination unit 160 determines a focus state about a subject by using a determined focus detecting method. Determination operation of the focus state will be explained hereinafter with reference to FIG. 3.

The determination unit 160 can calculate an optimal focal position (or focus) by using focus information at, for example, three different positions of a focus lens, and a driving direction of the focus lens to move to the calculated optimal focal position. Operations to calculate the focal position and the driving direction will be explained later with reference to FIG. 11.

The determination unit 160 provides the calculated optimal focal position and driving direction to the control unit 180. The determination unit 160 can perform focus detection according to a focus detecting method determined by the control unit 180. Here, the focus detecting method may include performing a wobbling operation, a manual focusing operation, and an operation combining the wobbling operation and the manual focusing operation.

The determination unit 160 can change a driving state of the wobbling operation according to an aperture value and a focus state of the lens unit 150.

The image processing unit 170 can correct and/or process images generated by the image pickup unit 140. In detail, the image processing unit 170 can perform signal processing of format conversion for generated images, digital zoom for adjusting an image scale, auto white balance (AWB), auto focus (AF), auto exposure (AE), color correction, blur reduction, image sharpening, etc. In exemplary embodiments of the present general inventive concept, the image processing unit 170 can generate video files by combining voice signals received through a separate internal microphone of the image pickup apparatus 100 or an external microphone and a plurality of photographed images, and can store the generated video files in the storage unit 130.

The control unit 180 can control each configuration within the image pickup apparatus 100, and the control unit 180 can control the operation of the image pickup apparatus 100. In detail, when the power of the image pickup apparatus 100 is turned on, the control unit 180 controls the image pickup unit 140 to read exposure and image data at a predetermined interval (for example, unit of 1/60 second, hereinafter this unit is referred to as one frame), and controls the user interface unit 120 to display the read images thereon.

The control unit 180 calculates a luminance value of the read image, and can control an aperture, exposure time, gain values, etc. for the photographed image to have a proper brightness. That is, the control unit 180 can control the aperture, exposure time, gain values, etc. so that captured images may have a predetermined brightness.

When the user selects the manual focusing mode, the control unit 180 can determine a focus detecting method to be applied among a plurality of focus detecting methods depending on the focus state. The focus state can include, for example, when there is no focus operation, when a focus operation is less than or equal to a predetermined amount of focus, and when a focus operation is greater than the predetermined about of focus. In detail, when there is no focus operation of the user or when a size of the focus operation is less than or equal to a predetermined size (e.g., if the amount of movement of a focus lens 153 to focus an image by the user is less than or equal to a predetermined amount), the control unit 180 can select a wobbling operation method as the focus detecting method to be applied. As described in detail below, a wobbling operation may be where the control unit 180 obtains evaluation values at three positions of the focus lens (e.g., focus lens 153 illustrated in FIG. 2) while moving the focus lens forward and/or backward in a linear direction by a predetermined distance. When the size of the focus operation (e.g., the amount of movement of a focus lens 153 to focus an image according to the user's input) exceeds the predetermined size, the control unit 180 can determine the manual focusing operation method as the focus detecting method to be applied. When the focus state is determined by the determination unit 160, the control unit 180 can control the user interface unit 120 to indicate the determined focus state.

When the zoom lens (e.g., zoom lens 151 illustrated in FIG. 2) is being driven, the control unit 180 can control the determination unit 160 and the user interface unit 120 so that the focus detecting method is not performed and a corresponding detecting result is not indicated. When operating in this manner, the image pickup apparatus 100 can reduce unnecessary power consumption thereof.

As described above, since the image pickup apparatus 100 according to exemplary embodiments of the present general inventive concept provides information about the focus state even while the user is taking an image by the manual focusing method, the user can more easily perform focusing on a subject. Also, when a focus operation value of the user is larger than a predetermined focus operation value, the image pickup apparatus 100 can determine the focus state without performing a separate wobbling operation.

Although FIG. 1 illustrates that the determination unit 160 and the control unit 180 are separate from each other, functions of the determination unit 160 and the control unit 180 may be integrated. That is, a controller and/or processor may perform the functions and operations described above in connection with the determination unit 160 and the control unit 180. Such a case will be described hereinafter with reference to FIG. 2.

Figure 2:
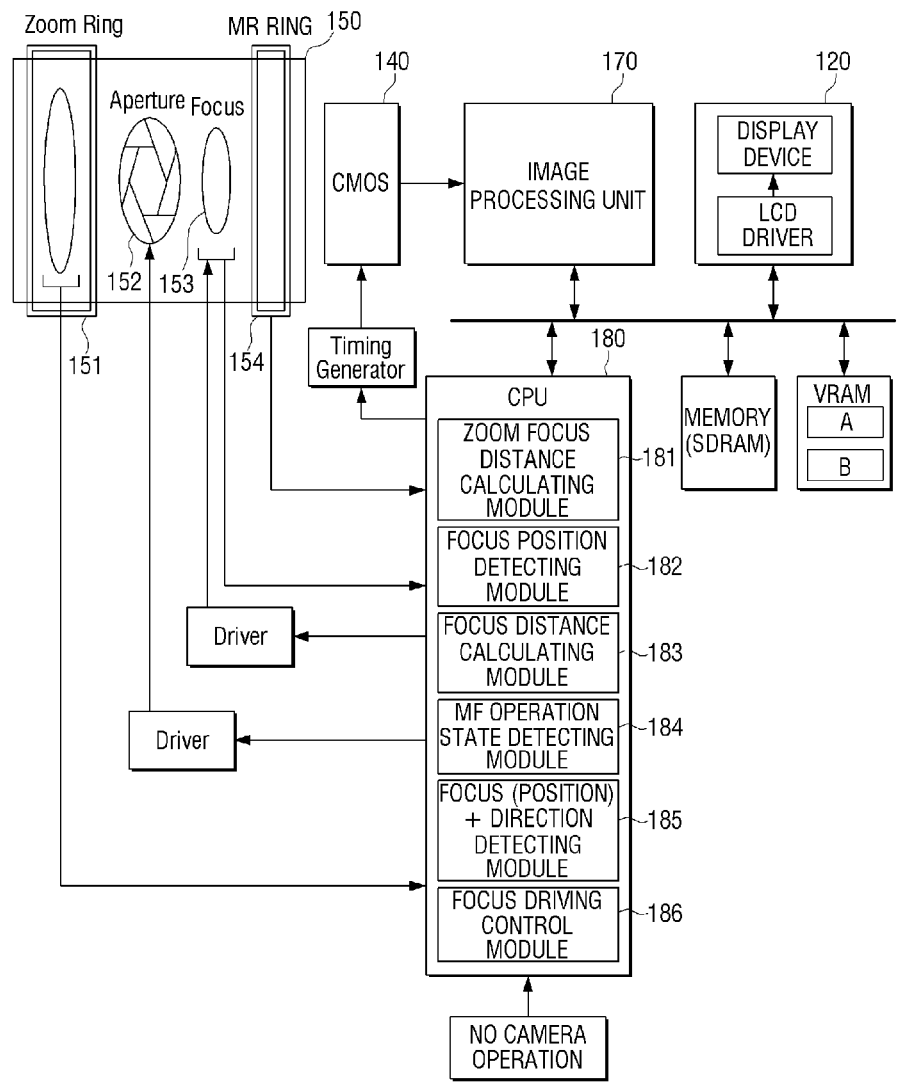
FIG. 2 is a view illustrating a lens unit and a control unit of the image pickup apparatus of FIG. 1.

FIG. 2 is a view illustrating detailed configuration of a lens unit and a control unit of the image pickup apparatus of FIG. 1.

Referring to FIG. 2, the lens unit 150 may include of a zoom lens 151, an aperture 152, a focus lens 153, and a manual ring 154. A function of each component of the lens unit 150 is widely known; therefore, detailed explanations thereof will be omitted.

The control unit 180 can include a zoom focus distance calculating module 181, a focal position detecting module 182, a focus distance calculating module 183, a MF (manual focus) operation state detecting module 184, an optimal focal position and direction calculating module 185, and a focus driving module 186.

The zoom focus distance calculating module 181 calculates a current zoom focus distance of the zoom lens 151. The zoom focus distance may be a position of the zoom lens 151 from a reference position, and/or a linear distance of movement of the zoom lens 151 from a reference position. In detail, the zoom focus distance calculating module 181 detects an output resistance value of a variable resistor of the zoom lens 151, and can calculate the zoom focus distance by using a pre-stored lookup table of detected resistance value vs. zoom focus distance. The calculated zoom focus distance can be stored in the storage unit 130.

The zoom focus distance calculating module 181 detects whether the zoom lens 151 is driven. In detail, the zoom focus distance calculating module 181 compares the zoom focus distance of the previous frame and the zoom focus distance of the current frame, and, if there is any difference, can determine that the zoom lens 151 has been driven.

The focal position detecting module 182 detects a position of the focus lens. In detail, when the focus lens is at infinity, there is an electrically short-circuit contact. When starting, the image pickup apparatus 100 drives the focus lens, and detects an electrical short-circuit or a ground state while driving the focal position in a direction of proximity until the short-circuit state is detected.

The focus distance calculating module 183 stores a lookup table corresponding to the zoom focus distance, the focus distance, and the focus lens, and calculates the focus distance by using the detected focal position and the zoom focus distance that was previously calculated using the stored lookup table.

The lens unit 140 can include the manual ring 154, and a detector to detect a direction of rotation and an amount of rotation of the manual ring 154. Accordingly, the MF operation state detecting module 184 can detect the presence of the user's focus operation, an operation direction (i.e., a direction of rotation of the manual ring 154), and an amount of operation (i.e., the amount of rotation of the manual ring 154) by comparing a pre-stored detecting result with a current detected result of the manual ring position and of the detector.

The optimal focal position and direction calculating module 185 calculates an optimal focal position and a driving direction of the focus lens to move to the optimal focal position. The optimal focus position may, for example, achieve a sharp image over a desired range within a scene of a subject. Such calculation operations will be explained hereinafter with reference to FIG. 11.

The focus driving module 186 performs focus detecting depending on the determined detecting method. The focus detecting method will be explained hereinafter with reference to FIGS. 3, 4 and 5.

Figure 3:
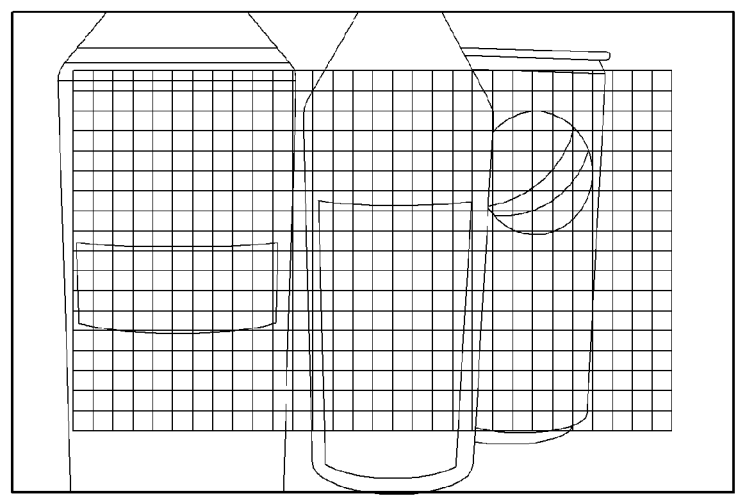
FIG. 3 is a view illustrating an evaluating operation of a focus state according to exemplary embodiments of the present general inventive concept.

FIG. 3 is a view illustrating an evaluating operation of a focus state according to exemplary embodiments of the present general inventive concept.

As illustrated in FIG. 3, the image pickup apparatus 100 divides a plurality of areas (for example, 30×18 blocks as illustrated in FIG. 3), and calculates an evaluation value representing sharpness of each of the divided areas. The image pickup apparatus 100 evaluates the focus state at each of the areas by using evaluation values calculated at a plurality of positions of the focus lens. The evaluation of the focus state at each area may be performed by the determination unit 160 or control unit 180, as described above.

Typically, whether the subject is focused on may not be determined by the evaluation value at only one position of the focus lens, and the driving direction may also not be detected from the evaluation value at only one position. Accordingly, in order to identify the optimal focal position, the image pickup apparatus 100 may calculate evaluation values in at least three positions of the focus lens.

Accordingly, in exemplary embodiments of the present general inventive concept, when a user's focus operation occurs, evaluation values in three positions of the focus lens that are calculated according to the movement of the focus lens by the user's focus operation. When there is no user's focus operation, evaluation values at three positions of the focus lens are determined by performing a wobbling operation, where the control unit obtains evaluation values at three positions of the focus lens while moving the focus lens forward and/or backward in a linear direction by a predetermined distance. When a user's focus operation is detected, but the amount of the focus operation is less than or equal to a predetermined value, evaluation values at three positions of the focus lens are determined by adding the wobbling operation to the amount of the user's focus operation.

Since the evaluation value indicates sharpness, a change of the evaluation value is greater than a predetermined value (i.e., relatively large) in a focal position that is near the optimal focal position. However, if the subject has a contrast value that is less than or equal to a predetermined value, the evaluation value itself is not larger than a predetermined value even in the optimal focal position, so the evaluation value is not suitable to detect the optimal focal position. Since the evaluation value does not change or changes less than a predetermined amount by driving the focus lens in a focal position that is located at a first predetermined distance position (e.g., too far away; namely, at an infinity position) and in a focal position that is located at a second predetermined distance position (e.g., too closely; namely, a proximity position), it is not appropriate to use the infinity and proximity positions to detect the optimal focal position.

Therefore, exemplary embodiments of the present general inventive concept use focal positions near the optimal focal position, except focal positions (i.e., infinity and proximity) that are not appropriate to be used as described above, among various focal positions. Hereinafter, a method of selecting such focal positions will be explained with reference to FIG. 4.

Figure 4:
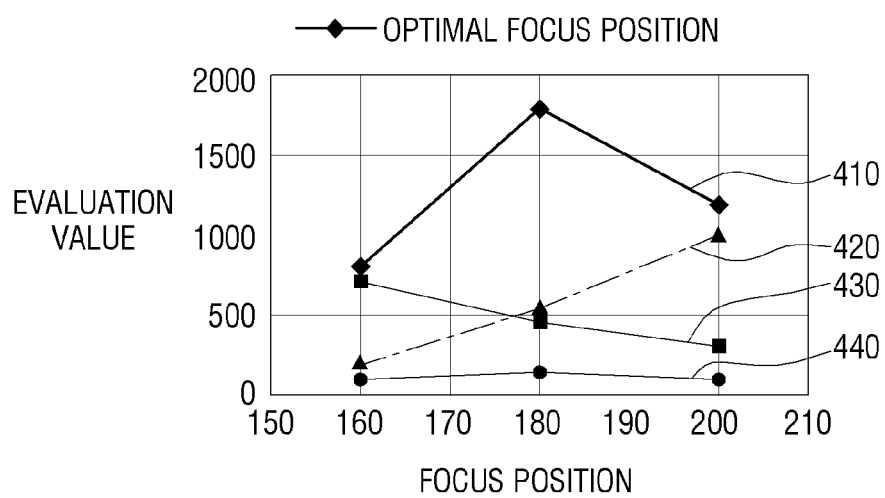
FIGS. 4 and 5 are views illustrating a calculating operation of an optimal focal position according to exemplary embodiments of the present general inventive concept.

FIG. 4 illustrates a change of the evaluation values in four patterns.

Referring to FIG. 4, in a focal position 410 near the optimal focal position, which is one of the four patterns (e.g., focal positions 410, 420, 430, and 440), an evaluation value is increased and decreased by the movement of the focus lens. That is, as focal position 410 is moved from position 160 to 180, the evaluation value increases, and when the focal position 410 is moved from position 180 to 200, the evaluation value decreases.

In a focal position 420 on the infinity position, the evaluation value is increased as the distance is increased. That is, as the position of focal position 420 moves from 160 to 200, the evaluation value increases. In a focal position 430 on the proximity position, the evaluation value is increased as the distance gets shorter. That is, as the position of focal position 430 moves from 200 to 160, the evaluation value increases.

In a focal position 440, to which the distance can be specified, the evaluation value is constant regardless of change of the focus distance.

Since three patterns among the four patterns may not be suitable to determine the optimal focal position as described above, the evaluation values in three focal positions are determined block-by-block within the image to be close to any one of the four patterns, and block areas having the pattern in which the evaluation value is increased and decreased (e.g., focal position 410) can be used to calculate the optimal focal position. That is, block areas having a pattern in which the evaluation value is increased and decreased as in focal position 410 can be selected and used to calculate the optical focus position.

Figure 5:
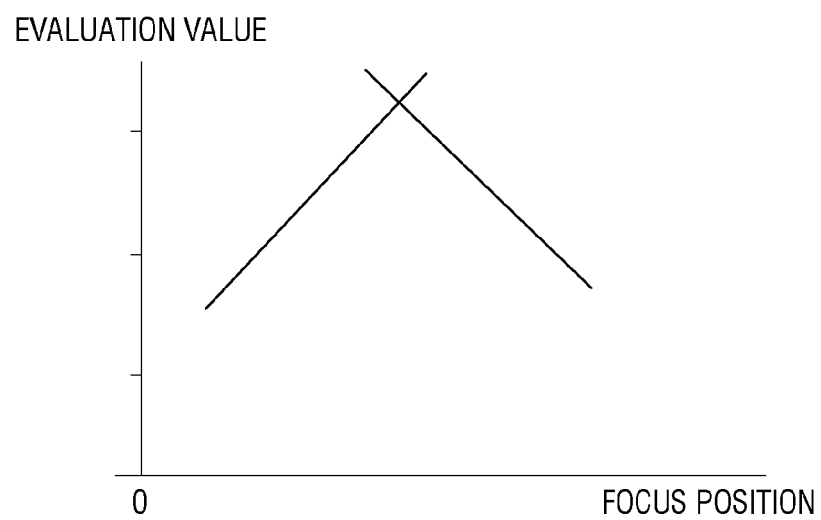

After selection of the block area is completed, FIG. 5 illustrates that the optimal focal position can be detected by using an intersection of a first straight line connecting the maximum and minimum values of the three evaluation values and a second straight line that is symmetrical to the first straight line and passes the intermediate value.

The three focal positions as described above may be set at positions beyond an allowable focus range (depth of field); therefore, it is possible to detect a more precise optimal focal position by using the three focal positions that are set at positions beyond the allowable focus range.

Figure 6:
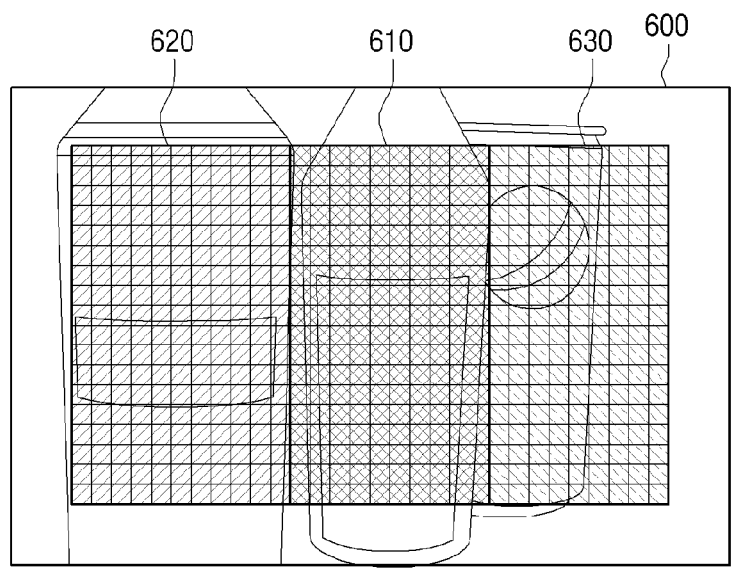
FIGS. 6 and 7 are views illustrating examples of user interface windows that can be displayed on a user interface unit of FIG. 1.
Figure 7:
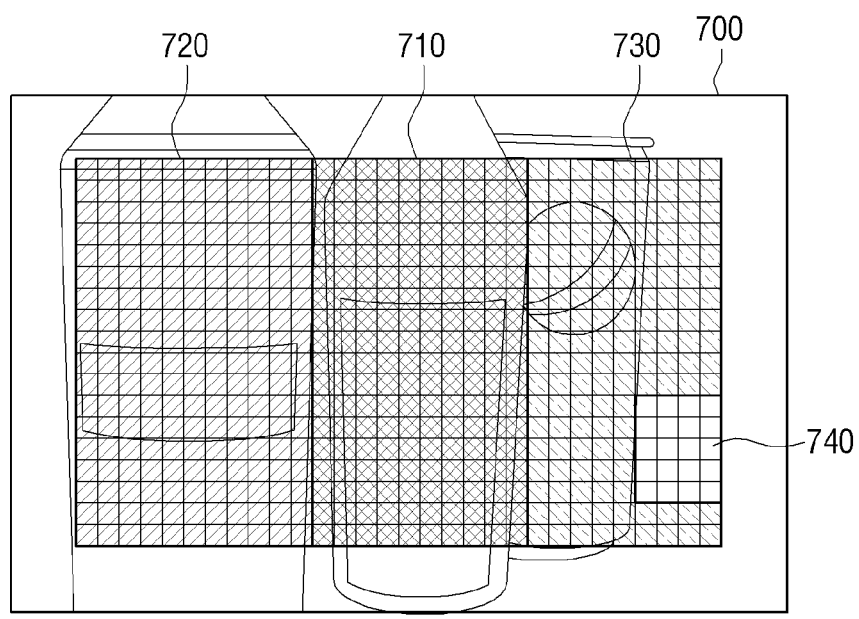

FIGS. 6 and 7 are views illustrating examples of user interface windows that can be displayed on a user interface unit of FIG. 1.

Referring to FIG. 6, the user interface window 600 displays a focus state of each block in which focus adjustment has not been carried out.

Here, a first area 610 is an area at the optimal focal position, that is, the area is right in focus. The first area 610, for example, may be indicated, for example, in a yellow color.

Then, a second area 620 is an area at a focal position in front of the optimal focal position. The second area 620, for example, may be indicated in a blue color. In exemplary embodiments of the present general inventive concept, the second area 620 may be indicated in different colors depending on the degree (i.e., amount) of focus deviation. For example, an area focus difference of which is greater than a predetermined value may be indicated in a dark blue color, and an area focus difference of which is less that or equal to the predetermined value may be indicated in a light blue color.

A third area 630 is an area in a focal position behind the optimal focal position. The third area 630, for example, may be indicated in a cyan color. In exemplary embodiments of the present general inventive concept, the third area 630 may be indicated in different colors depending on the degree (i.e., amount) of focus deviation. For example, an area focus difference of which is greater than a predetermined value may be indicated in a dark cyan color, and an area focus difference of which is less than the predetermined value may be indicated in a light cyan color.

In the above description and FIG. 6, the user interface window 600 indicates the calculated focus states. However, during the user's focus operation, information of whether the user's focus operation is effective may be indicated together on the user interface window. Such an example will be described hereinafter with reference to FIG. 7.

Referring to FIG. 7, the user interface window 700 is one example of the user interface window that can be displayed during the user's focus operation according to exemplary embodiments of the present general inventive concept.

A fourth area 710 is an area in the optimal focal position, that is, the area is right in focus. The fourth area 710, for example, may be indicated in a yellow color.

A fifth area 720 is an area in a focal position in front of the optimal focal position. If the user is moving in a direction of infinity, that is, if the user's focus operation is performed in a direction in which the fifth area increasingly becomes out of focus, the fifth area 720 may indicate that the direction of the user's operation is not valid. The fifth area 720, for example, may be indicated in a red color. In exemplary embodiments of the present general inventive concept, the fifth area 720 may be indicated in different colors depending on the degree of focus deviation. For example, an area focus difference of which is greater than a predetermined value may be indicated in a dark red color, and an area focus difference of which is less than the predetermined value may be indicated in a light red color.

A sixth area 730 is an area in a focal position behind the optimal focal position. If the user is moving in the direction of infinity, that is, if the user's focus operation is performed in a direction in which the sixth area comes into focus, the sixth area 730 may indicate that the direction of the user's operation is valid. The sixth area 730, for example, may be indicated in a green color. In exemplary embodiments of the present general inventive concept, the sixth area 730 may be indicated in different colors depending on the degree of focus deviation. For example, an area focus difference of which is big may be indicated in a dark green color, and the area focus difference of which is not greater than a predetermined value may be indicated in a light green color.

A seventh area 740 may be an area in which the optimal focal position cannot be evaluated. The seventh area 740, for example, may be indicated in a white color.

With the image pickup apparatus 100 according to exemplary embodiments of the present disclosure, the user interface window provides the user with information about the focus state and effectiveness about the driving direction even while being driven by the manual focusing method. Therefore, the user can adjust the focus.

Figure 8:
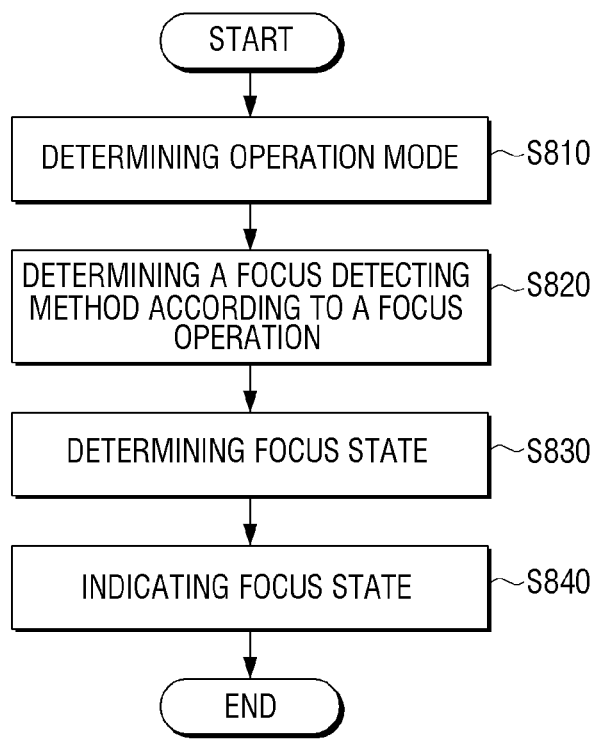
FIG. 8 is a flow chart illustrating a driving method of an image pickup apparatus according to exemplary embodiments of the present general inventive concept.

FIG. 8 is illustrates a flow chart of a driving method of a photographing apparatus according to exemplary embodiments of the present general inventive concept.

Referring to FIG. 8, a control unit (e.g., the control unit 180 illustrated in FIG. 1) determines an operation mode of the image pickup apparatus at operation S810. In detail, the control unit determines whether at least one of an automatic focusing mode and/or a manual focusing mode is selected as the focusing mode by the user.

If the operation mode of the image pickup apparatus is the manual focusing mode, the control unit determines a focus detecting method to be applied among a plurality of focus detecting methods according to the focus operation of the user at operation S820. In detail, when there is no user's focus operation, a wobbling method is determined as the focus detecting method to be applied. When the user's focus operation is greater than a predetermined amount, a manual method is determined as the focus detecting method to be applied. When the user's focus operation is less than the predetermined amount, a method combining the wobbling method with the manual method may be determined as the focus detecting method to be applied. Here, the wobbling method is a method in which while moving a focus lens forward/backward in a linear direction by a predetermined distance, the control unit obtains evaluation values at three positions of the focus lens. The manual focus operation method is a method in which the control unit obtains evaluation values at positions of the focus lens that is being changed by the user's focus operation. The combining method is a method that if an amount of movement of the focus lens by the user's focus operation is not more than an allowable focus range (depth of field), the control unit moves the focus lens forward and/or backward, and obtains the evaluation values at three positions of the focus lens beyond the allowable focus range.

The control unit determines a focus state about a subject by using the determined focus detecting method (e.g., the wobbling method, manual focus operation method, or the combining method) at operation S830, and indicates the determined focus state at operation S840. Operations for determining the focus state and indicating the result are described hereinbefore; therefore, explanations thereof will be omitted.

Figure 9:
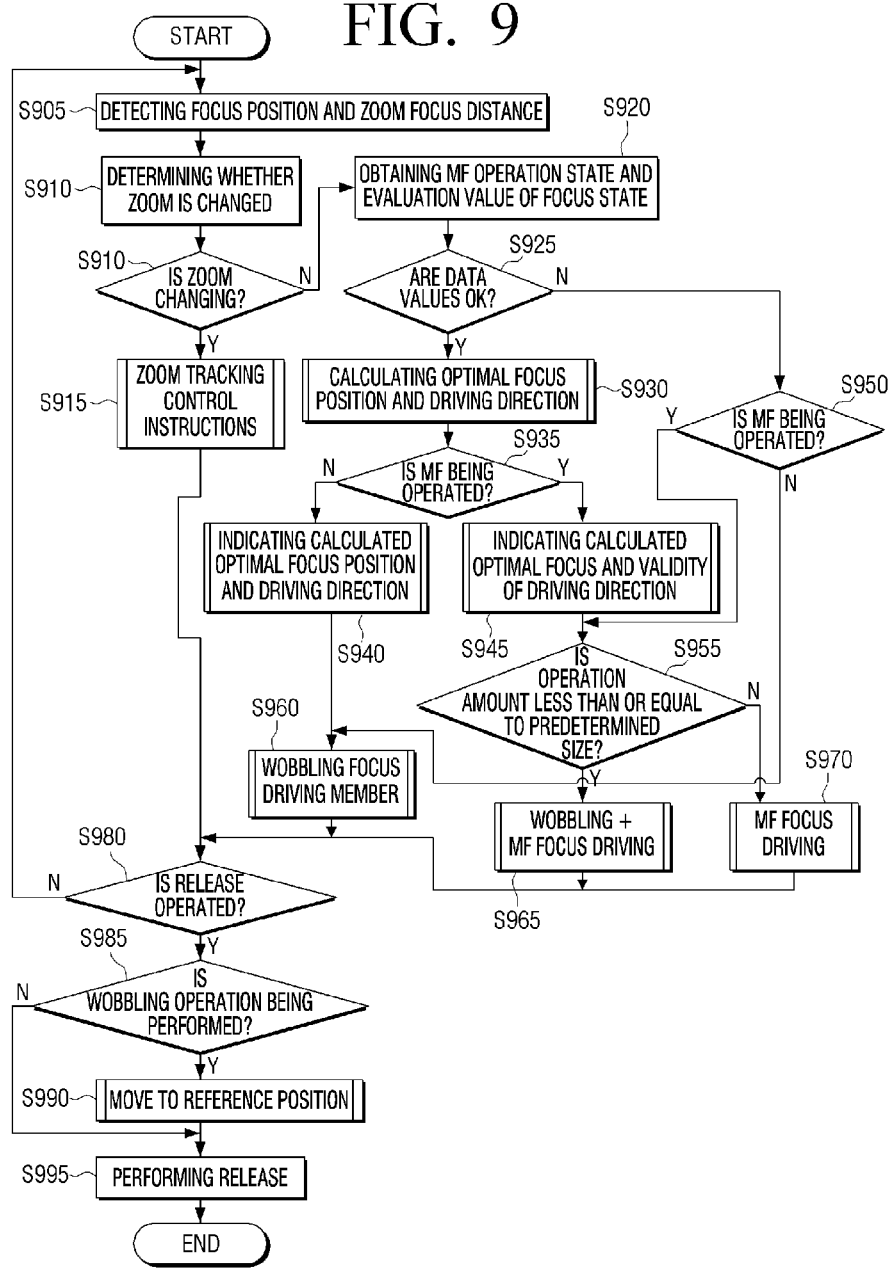
FIG. 9 is a flow chart illustrating a driving method of an image pickup apparatus according to exemplary embodiments of the present general inventive concept.

FIG. 9 is a flow chart illustrating a driving method of a photographing apparatus according to exemplary embodiments of the present general inventive concept.

When the user selects the manual focusing mode as the operation mode of the image pickup apparatus, the control unit detects and stores a focal position and a zoom focus distance at operation S905. In detail, the zoom focus distance can be detected based on a resistance value linked to a rotational position of the zoom ring 151 of the lens unit 150, and the focal position can be detected based on a position of the focus lens 153 of the lens unit 150. Such detecting operations can be performed by a controlling unit (e.g., a frame unit and/or the controller 180 illustrated in FIGS. 1 and 2) of the image pickup device (e.g., image pickup apparatus 100).

At operation S910, the control unit (e.g., the control unit 180) determines whether the zoom is changed. In detail, the control unit compares the zoom focus distance of a current frame with the zoom focus distance of the previous frame, and, if the zoom focus distance is changed, determines that the zoom is being changed. If there is no difference between the zoom focus distance of a current frame with the zoom focus distance of the previous frame in a comparison operation performed by the control unit, the control unit determines that the zoom is not changed.

If it is determined that the zoom is being changed at operation S910-Y, the control unit performs a zoom tracking control at operation S915. The zoom tracking control will be explained hereinafter with reference to FIG. 10.

If it is determined that the zoom is not changed at S910-N, the control unit performs a manual focusing assist operation according to exemplary embodiments of the present general inventive concept.

The control unit detects an operational status of the manual focusing mode, and obtains an evaluation value of the focus state at operation S920. Here, the evaluation value of the focus state is an evaluation value corresponding to a contrast value of each block of an image.

In exemplary embodiments of the present general inventive concept, a focal position and evaluation value of the focus state of each of the frame before the previous frame, the previous frame, and the current frame are used to calculate an optimal focal position and a method for moving to the optimal focal position (e.g., moving the focus lens manually or driving the focus lens). Therefore, the control unit obtains the focal position and evaluation value of the focus state of the frame before the previous frame, the previous frame, and the current frame.

If three data values are not obtained at operation S925-N, the optimal focal position may not be detected, and the control unit can detect whether there is a manual focusing operation of the user at operation S950. That is, when the data values are not obtained at operation S925, the control unit can determine whether there is a manual focusing operation by the user at S950.

In contrast, if the three data values are obtained at operation S925-Y, the control unit calculates the optimal focal position and the driving direction for moving to the optimal focal position at operation S930. Detailed calculating operations of the optimal focal position and the driving direction will be explained hereinafter with reference to FIG. 11.

When the optimal focal position and driving direction are calculated, the control unit determines whether the user performs the focus operation at operation S935. That is, when the optimal focal position and driving direction are calculated, the control unit determines whether there is a manual focusing operation by the user at operation S935.

When there is no user's focus operation at operation S935-N, the control unit indicates the calculated optimal focal position and driving direction for the user at operation S940, and performs a wobbling operation method at operation S960. In detail, the control unit can control the focus lens to move from a reference position sequentially by the calculated amount in the direction of infinity and in the direction of proximity. A more detailed wobbling operation method will be described hereinafter with reference to FIG. 12.

When there is a user's focus operation (i.e., at operation S935-Y), the control unit indicates the calculated optimal focal position and validity of the driving direction for the user at operation S945, and determines whether an operation amount of the user's focus operation (e.g., which may include a user's manual focus operation) is less than or equal to the predetermined size at operation S955.

If the operation amount of the user's focus operation is less than or equal to the predetermined size at operation S955-Y, the wobbling focus driving and the manual focus driving can be performed at operation S965. In exemplary embodiments of the present general inventive concept, the wobbling focus driving and the manual focus driving can be performed simultaneously. In detail, if the operation amount of the user's focus operation is less than the control width of the wobbling of 40 pulses, the control unit may not obtain the amount of focus deviation so to detect the optimal focal position. Therefore, the control unit adds the driving amount of the wobbling to the operation amount of the user's focus operation, and performs the driving control. Such an operation will be explained hereinafter with reference to FIG. 14.

When the amount of the user's focus operation is determined to be greater than the predetermined size at operation S955-N, the manual focus driving is performed at operation S970. In other words, the control unit calculates evaluation values at three focal positions by the user's operation (e.g., the focus state before the previous frame, the focus state of the previous frame, and the focus state of the current frame).

After the focus is adjusted by the above-described operations, if a release operation command (namely, an image pickup command) is received from the user at operation S980, the control unit determines whether the wobbling focus driving is currently being performed at operation S985. If the wobbling focus driving is not currently performed at operation S985-N, the control unit performs the image pickup operation at operation S995.

If the wobbling focus driving is being currently performed at operation S985-Y, the control unit moves the focus lens to the position (namely, the reference position) before (e.g., immediately before) the wobbling focus driving is performed at operation S990, and performs the image pickup operation (i.e., at operation S995). In detail, in exemplary embodiments of the present general inventive concept, since the wobbling operation is irrespective of the photographer's intention, if the wobbling operation is being performed when the photographer takes a picture (i.e., selects the release operation), the control unit can release the wobbling operation and control the focus lens to be driven to the reference focal position before the start of the wobbling operation.

With the driving control method according to exemplary embodiments of the present general inventive concept, even when the user takes a picture by the manual focusing method, information about the focus state is provided to the user. Therefore, the user can more easily perform focusing on the subject. The driving control methods as illustrated in FIGS. 8 and 9 can be carried out in an image pickup apparatus, such as the image pickup apparatus 100 as illustrated in FIG. 1. Alternatively, the driving control methods may be carried out in image pickup apparatuses having different configurations.

The driving control method as described above may be implemented as at least one executable program, that, when executed by a computer, performs the driving control method as described above. Such an executable program may be stored in a computer-readable recording medium.

Accordingly, each operation of the present general inventive concept illustrated in FIG. 9 may be implemented as at least one computer-recordable code on a computer-readable recording medium. The computer-readable recording medium may include a device that can store data that can be read by a computer system.

Figure 10:
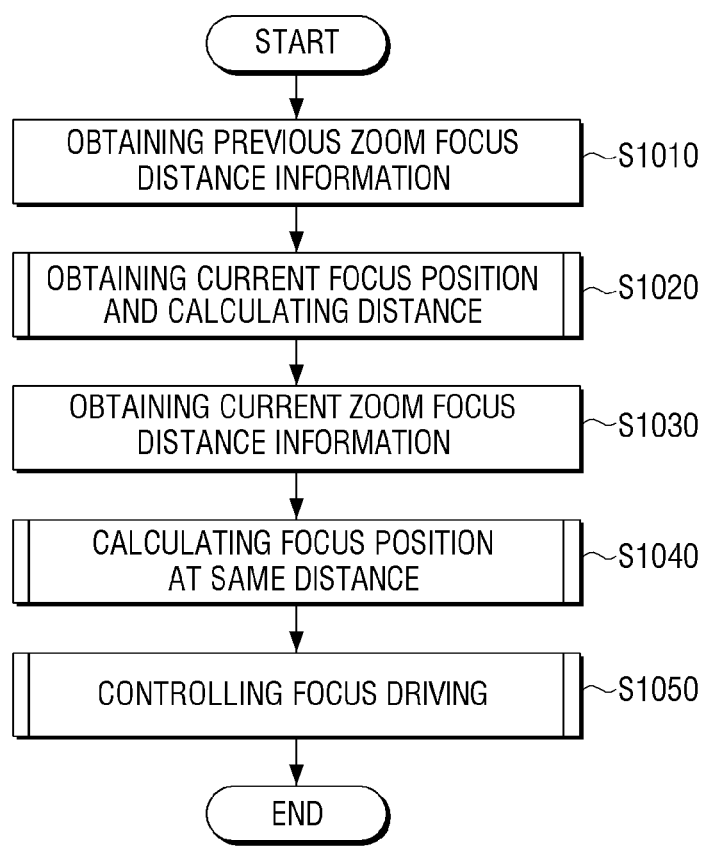
FIG. 10 is a flow chart illustrating a zoom-tracking operation of the driving method of FIG. 9.

FIG. 10 is a flow chart illustrating a zoom-tracking operation of the driving method of FIG. 9.

In detail, when the user manipulates the zoom (e.g., the zoom lens 151 of FIG. 2), the control unit can determine that the focus operation is not performed. Therefore, in exemplary embodiments of the present general inventive concept, the image pickup apparatus may refrain from providing the user with state information of the focus during a user's manipulation of the zoom. In detail, because the focus may be at the same position, the optimal focus distance (or focus distance) can be changed by the manipulation of the zoom (e.g., zoom lens 151). That is, when the user manipulates the zoom, the optimal focus distance can be changed. Therefore, in order to minimize and/or prevent the focus distance from being changed by the zoom manipulation (e.g., the user's manipulation of the zoom lens 151), the control unit (e.g., control unit 180) can newly calculate the focal position depending on the changing of the zoom focus distance. This is referred to as a zoom-tracking control.

The control unit extracts the pre-stored zoom focus distance of the previous frame at operation S1010.

The control unit obtains the focal position of the current frame, and calculates a focus distance by using the obtained focal position and the zoom focus distance of the previous frame at operation S1020. In detail, since the storage unit 130 stores a data table including focal positions corresponding to the zoom focus distance and the focus distance, the control unit can calculate the focus distance by using the pre-stored data table.

At operation S1030, the control unit extracts the zoom focus distance of the current frame.

At operation S1040, the control unit can calculate the focal position of the current frame by using the extracted zoom focus distance of the current frame and the calculated focus distance.

The control unit controls the focus driving by using difference in the distance between the previous focal position and the calculated focal position at operation S1050. That is, the control unit 180 controls a driver to drive the focus lens 153 to a position determined by the difference in the distance between the previous focal position and the calculated focal position.

Figure 11:
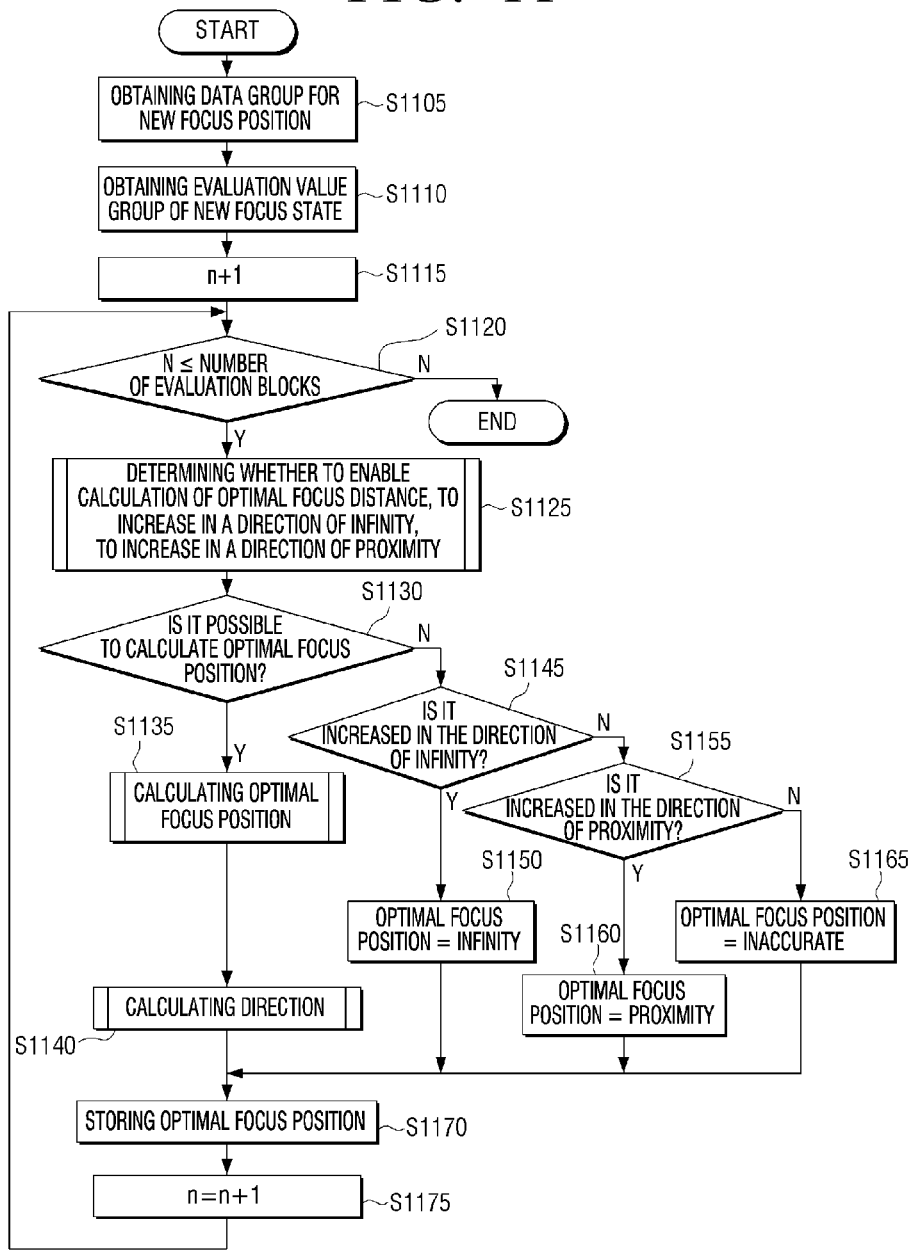
FIG. 11 is a flow chart illustrating an operation to calculate an optimal focal position and a driving direction of the driving method of FIG. 9.

FIG. 11 illustrates a flow chart of an operation to calculate an optimal focal position and driving direction of the driving method FIG. 9.

The control unit obtains a data group for the focal position at operation S1105, and obtains an evaluation value about each of the corresponded focal positions at operation S1110. The data group obtained by the control unit at operation S1105 may include the focus position before the previous frame, the focus position of the previous frame, and the focus position of the current frame.

At operation S1115, the control unit sets n=1, and, if n is larger than the number of evaluation blocks, terminates the operations to calculate the optimal focal position at operation S1120-N. If n is less than the number of evaluation blocks, the control unit performs following tasks.

The control unit determines whether to calculate the focal position, to increase in the direction of infinity, or to increase in the direction of proximity at operation S1130.

If the determination result at operation S1130-Y is that the focal position can be calculated, the control unit calculates the optimal focal position at operation S1135, and calculates a direction for moving to the optimal focal position S1140. That is, the control unit can calculate the direction an amount of movement of the focus lens to position it in the optimal focus position.

If it is not possible to calculate the focal position at operation S1130-N, the control unit can determine whether to increase the focal position in the direction of infinity at operation S1145, and, if it is increased in the direction of infinity at operation S1145-Y, the control unit can set the optimal focal position at the infinity position at operation S1150.

If the focal position it is not increased in the direction of infinity at operation S1145-N, the control unit determines whether to increase the focal position in the direction of proximity at operation S1155, and, if it is increased in the direction of proximity (i.e., at operation S1155-Y), the control unit sets the optimal focal position at the proximity position at operation S1160.

If the focal position is not increased in the direction of proximity at operation S1155-N, the control unit determines that the optimal focal position is inaccurate at operation S1165.

The control unit stores the determined optimal focal position at operation S1170, increases the value of n by 1 at operation S1175, and repeats evaluation for the next block of the image.

Figure 12:
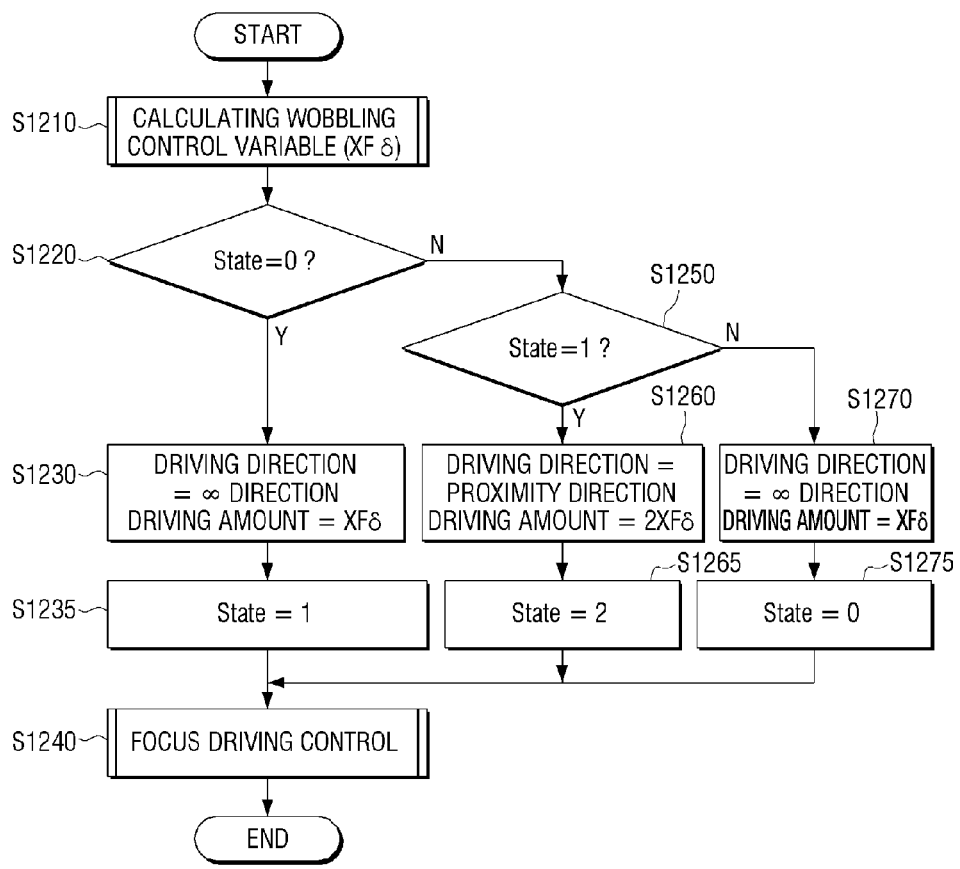
FIG. 12 is a flow chart illustrating an operation to calculate a wobbling control variable of the driving method of FIG. 9.

FIG. 12 is a flow chart illustrating focus driving by the wobbling method of the driving method illustrated in FIG. 9.

Referring to FIG. 12, the control unit calculates a wobbling control variable at operation S1210. In detail, the wobbling control variable (X) can be calculated by calculating the depth of field. Here, the depth of field is a difference value in an image, and may be calculated by the product of F (aperture) and $\delta$ (allowable circle of confusion). That is, the depth of field may be expressed as F $\delta$. Here, the allowable circle of confusion can be, for example, 15 µm. The image pickup apparatus 100 stores conversion coefficients to convert the amount of focus deviation to the amount of deviation on an image corresponding to the zoom focus distance. Accordingly, if the reference focal position is 180, for example, the aperture is 4, and the conversion coefficient corresponding to the zoom focus distance is $\frac{1}{12}$, the value becomes 8×$\frac{1}{12}$ so that the depth of field may be 40. As a result, in FIG. 4, the focal positions may be 140, 180, and 220. The wobbling control variable can be calculated by considering the focus state, and exemplary embodiments of the present general inventive concept related thereto will be explained hereinafter with reference to FIG. 13.

The control unit determines whether the state is zero (0) at operation S1220. Here, the state represents a position of the focus lens, where zero (0) is a position of the focus lens before performing the wobbling control, one (1) is a position of the focus lens that is moved in a direction towards infinity before performing the wobbling control, and two (2) is a position of the focus lens that is moved in a direction towards proximity before performing the wobbling control.

If the determination result is that the state is zero (namely, beginnings of the wobbling driving), the control unit drives the focus lens in the direction of the infinity according to the calculated wobbling control variable at operation S1230, and converts the state into a one (1) state at operation S1235. That is, as illustrated in FIG. 12, the driving amount of the focus lens is determined by multiplying the wobbling control variable (X) with the depth of field F$\delta$ (i.e., the multiplication of the aperture value (F) and the allowable circle of confusion ($\delta$)).

If the determination result is that the state is non-zero at operation S1220-N, the control unit determines whether the state is a one (1) state at operation S1250.

If the control unit that the state is a one state at operation S1250-Y, the control unit drives the focus lens in the direction of the proximity twice as much as the calculated wobbling control variable at operation S1260, and converts the state into a two (2) state at operation S1265. That is, as illustrated in FIG. 12, the driving amount of the focus lens is determined by multiplying two times the wobbling control variable (2×) by with the aperture value (F) and the allowable circle of confusion ($\delta$).

If the determination result is that the state is not a one (1) state at operation S1250-N, the control unit drives the focus lens in the direction of the infinity according to the calculated wobbling control variable at operation S1270 (that is, drives it to the initial position), and converts the state into a zero (0) state at operation S1275. That is, the driving amount of the focus lens is determined by multiplying the wobbling control variable (X) with the depth of field F$\delta$ (i.e., the multiplication of the aperture value (F) and the allowable circle of confusion (0)), and the state is converted to a zero (0) state.

When the state is converted, the control unit performs the wobbling control according to the converted state at operation S1240.

In exemplary embodiments of the present general inventive concept, since the wobbling operation method is used, even when there is no user's focus operation, evaluation values at three focal positions can be obtained.

Figure 13:
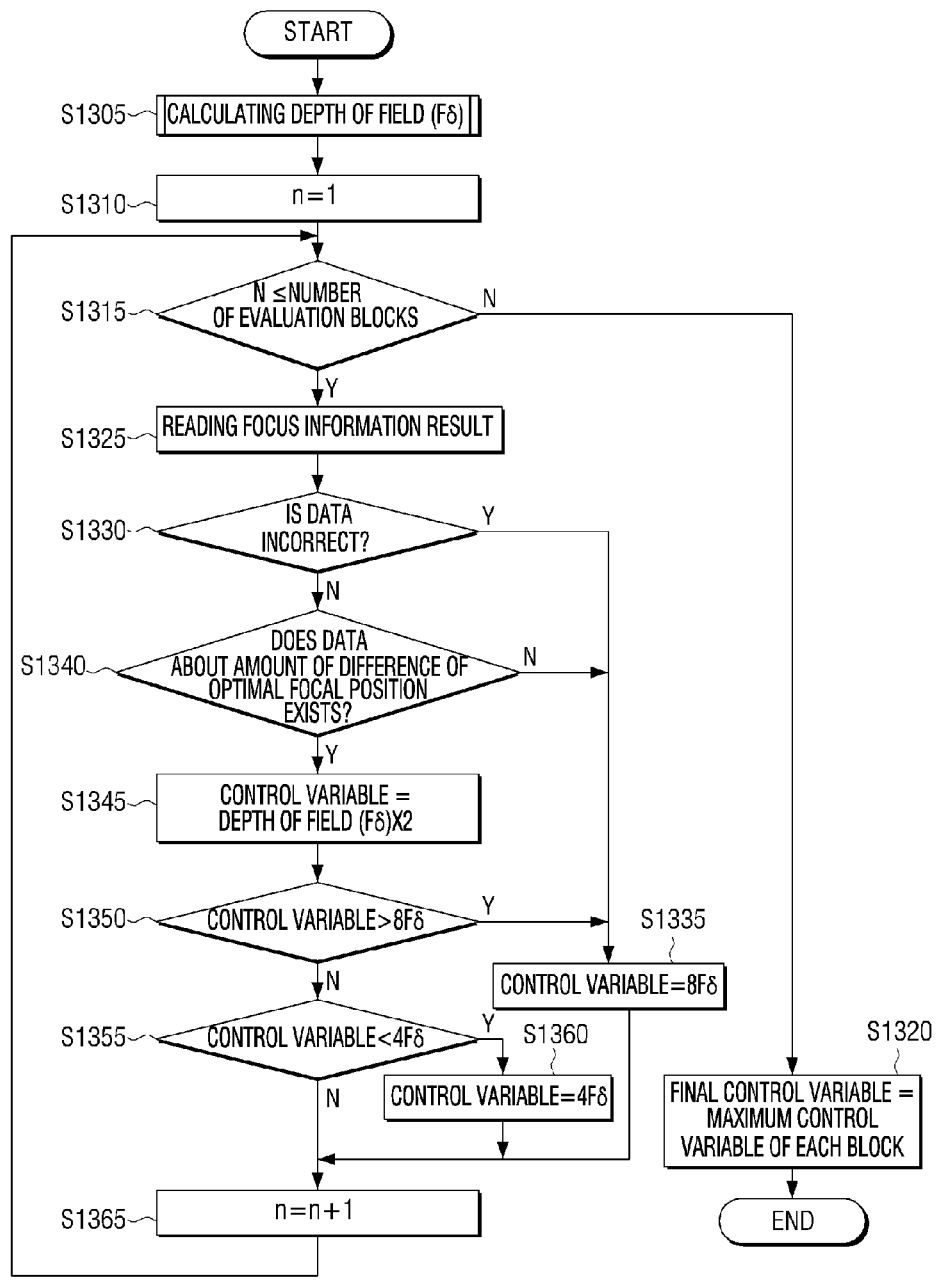
FIG. 13 is a flow chart illustrating an operation to calculate a wobbling control variable by considering a focus state according to exemplary embodiments of the present general inventive concept.

FIG. 13 is a flow chart illustrating an operation to calculate a wobbling control variable by considering a focus state.

At operation S1305, the control unit calculates the depth of field (F$\delta$).

The control unit sets the value of n to be 1 at operation S1310, and evaluates whether n is less than the number of evaluation blocks at operation S1315.

If the value of n is larger than the number of evaluation blocks (e.g., as determined at operation S1315-N), the control unit sets the final control variable as the maximum control variable of each block at operation S1320.

If the value of n is less than the number of evaluation blocks (e.g., as determined at operation S1315-Y), the control unit outputs the result of the focus state information, and, if the data (i.e., the resultant focus state information) is incorrect as determined at operation S1330-Y, the control variable can be calculated as 8 F$\delta$ at operation S1335.

If it is determined that the data (i.e., the resultant focus state information) is correct at operation S1330-N, the control unit determines whether data about the amount of difference of the optimal focal position exists at operation S1340.

If the data about the amount of difference of the optimal focal position does not exist at operation S1340-N, the control unit can calculate the control variable as 8 F$\delta$ at operation S1335.

If the amount of difference of the optimal focal position exists at operation S1340-Y, the control unit can set the control variable to be twice as much as the amount of difference of the optimal focal position at operation S1345. That is, the control variable is set to the multiplication of two times the wobbling control variable with the depth of field (F$\delta$).

If the set control variable exceeds 8 F$\delta$ at operation S1350-Y, the control unit can calculate the control variable as 8 F$\delta$ at operation S1335.

If the set control variable is less than 4 F$\delta$ as determined at operation S1355-Y, the control unit can calculate the control variable as 4 F$\delta$ at operation S1360.

After the control variable is calculated, the control unit increases the value of n by 1 at operation S1365.

Figure 14:
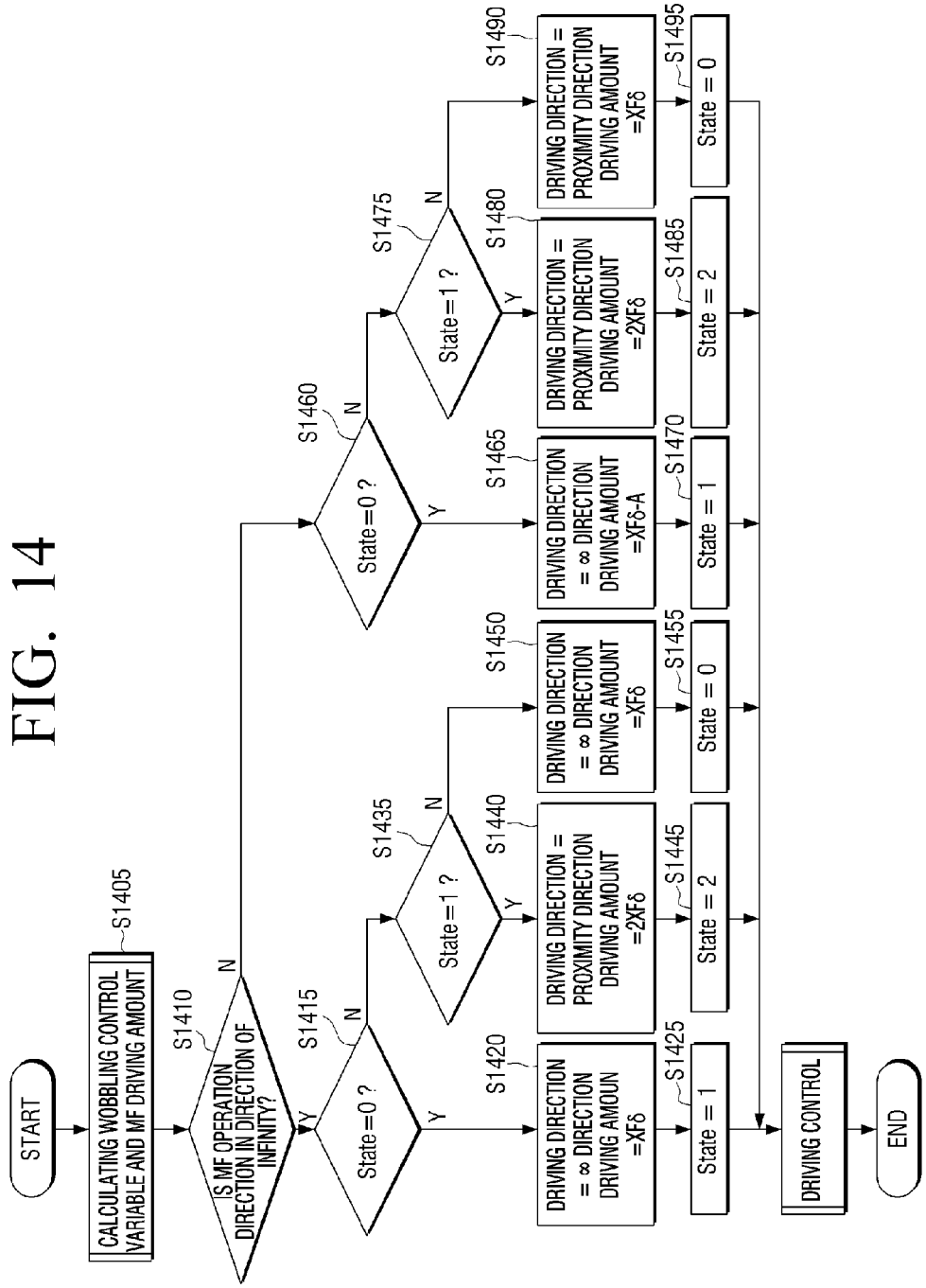
FIG. 14 is a flow chart illustrating focus driving by wobbling and a manual focus method according to the driving method of FIG. 9.

FIG. 14 is a flow chart illustrating focus driving by the wobbling and manual focus method of the driving method of FIG. 9.

Referring to FIG. 14, the control unit calculates the wobbling control variable, and a MF (manual focus) driving amount at operation S1405. The MF driving amount may be the amount of movement of the manual ring 154 to move the focus lens 153, or the linear distance movement of the focus lens 153 from a predetermined reference position.

The control unit determines whether the MF operation direction is in the direction of infinity at operation S1410.

If the MF operation direction is determined to be in the direction of infinity at operation S1410-Y, the control unit determines whether the state is a zero (0) state at operation S1415. Here, the state represents a position of the focus lens. The zero (0) state may be the position of the focus lens before the control unit performs a wobbling operation.

If the determination result is that the state is a zero (0) state (i.e., at the beginning of the wobbling driving), the control unit drives the focus lens in the direction of infinity according to the calculated wobbling control variable at operation S1420, and converts the state into a one (1) state at operation S1425. The one (1) state may be the position of the focus lens that is moved towards infinity. The driving amount of the focus lens (i.e., the amount to be driven by the control unit) can be determined by multiplying the calculated wobbling control variable (X) with the depth of field (F$\delta$) at operation S1420, and the state is converted to a one (1) state at operation S1425.

If the determination result is that the state is not a zero (0) state at operation S1415-N, the control unit determines whether the state is a one (1) state at operation S1435.

If the determination result is that the state is a one state at operation S1435-Y, the control unit drives the focus lens in the direction of the proximity twice according to the calculated wobbling control variable at operation S1440, and converts the state into a two (2) state at operation S1445. The two (2) state may be a position of the focus lens that is moved in the direction of proximity. The driving amount of the focus lens (i.e., the amount to be driven by the control unit) can be determined by multiplying twice the calculated wobbling control variable (2×) with the depth of field (F$\delta$) at operation S1440, and the state is converted to a two (2) state at operation S1445.

If the determination result is that the state is not a one (1) state at operation S1435-N, the control unit drives the focus lens in the direction of infinity according to the calculated wobbling control variable at operation S1450 (that is, drives it to the initial position), and converts the state into a zero state at operation S1455. The driving amount of the focus lens (i.e., the amount to be driven by the control unit) can be determined by multiplying the calculated wobbling control variable (X) with the depth of field (Fδ) at operation S1450, and the state is converted to a zero (0) state at operation S1455.

If the MF operation direction determined to be not the direction of infinity at operation S1410-N (namely, if the operation is in the direction of proximity), the control unit determines whether the state is a zero (0) state at operation S1460.

If the determination result is that the state is a zero (0) state (namely, at the beginning of the wobbling driving), the control unit drives the focus lens in the direction of infinity according to the amount left after the calculated MF driving amount is subtracted from the calculated wobbling control variable at operation S1465, and converts the state into a one (1) state at operation S1470. The driving amount of the focus lens (i.e., the amount to be driven by the control unit) can be determined by subtracting the amount left after the calculated MD driving amount from the multiplication of the calculated wobbling control variable (X) with the depth of field (Fδ) at operation S1465.

If the determination result is not a zero (0) state at operation S1460-N, the control unit determines whether the state is a one state at operation S1475.

If the determination result is that the state is a one (1) state at operation S1475-Y, the control unit drives the focus lens in the direction of proximity twice as much as the calculated wobbling control variable at operation S1480, and converts the state into a two (2) state at S1485. That is, the driving amount of the focus lens (i.e., the amount to be driven by the control unit) can be determined by multiplying twice the calculated wobbling control variable (X) with the depth of field (Fδ) at operation S1485.

If the determination result is that the state is not a one (1) state at operation S1475-N, the control unit drives the focus lens in the direction of infinity as much as the calculated wobbling control amount at operation S1490 (that is, drives it to the initial position), and converts the state into a zero (0) state at operation S1495. The driving amount of the focus lens (i.e., the amount to be driven by the control unit) can be determined by multiplying the calculated wobbling control variable (X) with the depth of field (Fδ) at operation S1490.

When the state is converted, the control unit performs the wobbling control again according to the converted state at operation S1430.

With the exemplary embodiments of the present general inventive concept as described above, even when the user does not operate the focus enough (e.g., adjust the focus more than a predetermined amount) so as to be able to have a predetermined amount of deviation of the focus, the wobbling operation is performed so that a predetermined amount of deviation of focus can be obtained. Therefore, evaluation values at three focal positions can be obtained.

Figure 15:
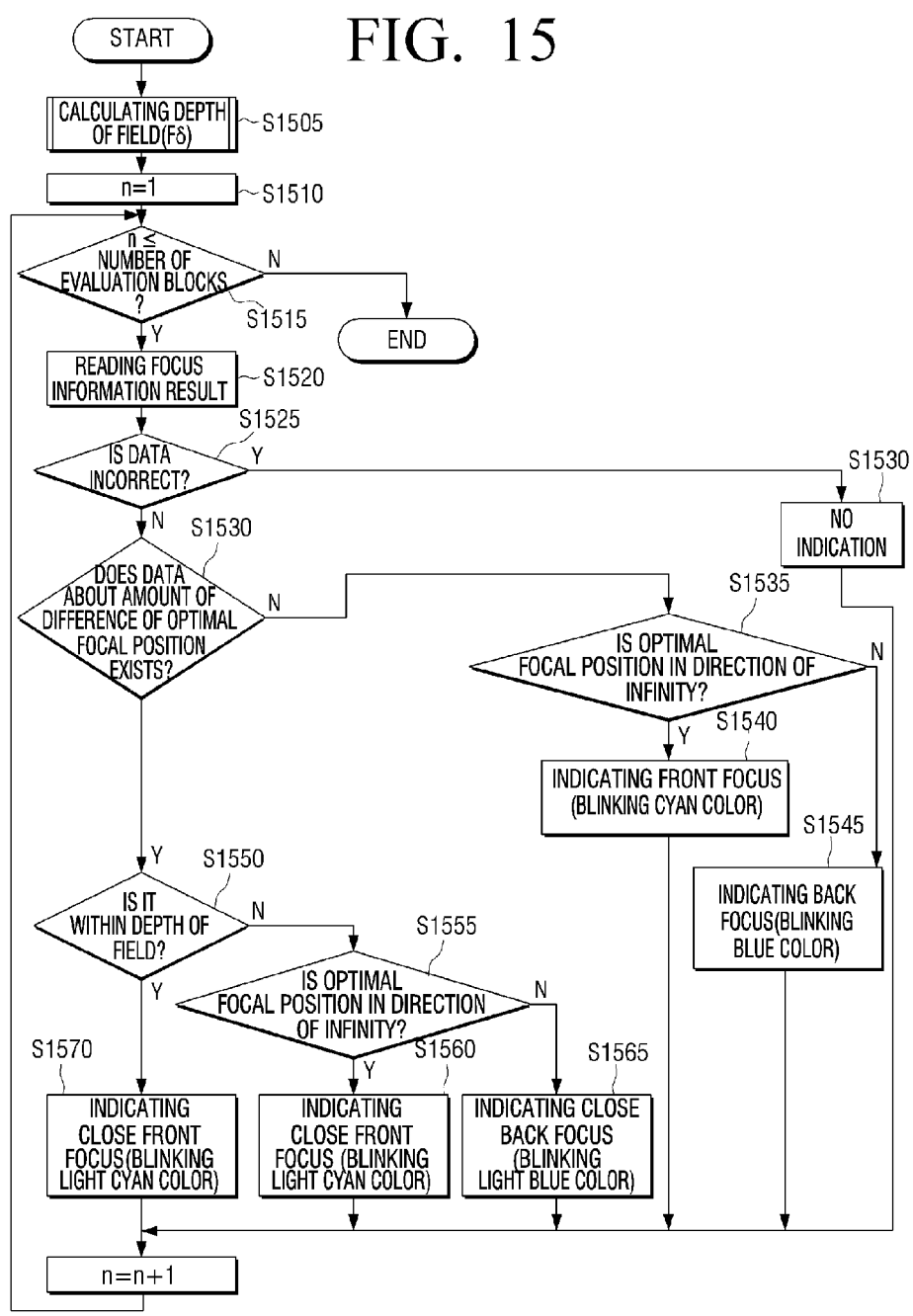
FIG. 15 is a flow chart illustrating an indicating operation when there is no user's focus operation in the driving method of FIG. 9.

FIG. 15 is a flow chart illustrating an indicating operation when there is no user's focus operation as determined in connection with the driving method of FIG. 9.

Referring to FIG. 15, the control unit calculates the depth of field Fδ at operation S1505.

The control unit sets the value of n to 1 at operation S1510, and evaluates whether n is less than the number of evaluation blocks of an image at operation S1515.

If it is determined that n is larger than the number of evaluation blocks at operation S1515-N, the control unit terminates the indication operation illustrated in FIG. 15.

If it is determined that n is less than the number of evaluation blocks at operation S1515-Y, the control unit outputs the result of the focus state information (e.g., a focus state of zero (0), one (1), or (2), where the state of zero (0) is a position of the focus lens before performing the wobbling control, one (1) is a position of the focus lens that is moved in a direction towards infinity before performing the wobbling control, and two (2) is a position of the focus lens that is moved in a direction towards proximity before performing the wobbling control), and, if the data is incorrect as determined at operation 1525-Y, the controller does not perform the indicating operation at operation S1530.

If the data is determined to be correct at operation S1525-N, the control unit determines whether data about the amount of difference of the optimal focal position exists at operation S1530.

If it is determined that the data about the amount of difference of the optimal focal position does not exist at operation S1530-N, the control unit determines whether the optimal focal position is in the direction of infinity at operation S1535. If the optimal focal position is determined to be in the direction of infinity at operation S1535-Y, front focus may be indicated. For example, a dark cyan color may blink to indicate front focus at operation S1540.

If it is determined that the optimal focal position is not in the direction of infinity at operation S1535-N, back focus may be indicated. For example, a dark blue color may blink to indicate back focus at operation S1545.

If it is determined that the data about the amount of difference of the optimal focal position exists at operation S1530-Y, the control unit determines whether the amount of difference of the optimal focal position is within the depth of field at operation S1550. If it determined that the amount of different of the optimal focus position is not within the depth of field at operation S1550-N, the control unit determines whether the optimal focal position is in the direction of infinity at operation S1555. If the optimal focal position is in the direction of infinity at operation S1555-Y, close front focus may be indicated. For example, a light cyan color may blink to indicate a close front focus at operation S1560.

If the optimal focal position is determined not to be in the direction of infinity at operation S1555-N, close back focus may be indicated. For example, a light blue color may blink to indicate a close back focus at operation S1565.

If the amount of difference of the optimal focal position is within the depth of field at operation S1550-Y, the optimal focal position may be indicated. For example, a yellow color may blink to indicate the optimal focus position at operation (S1570).

When color processing is performed about a block of an image, the control unit increases the value of n by 1 at operation S1575, and can perform color processing about different blocks.

Figure 16:
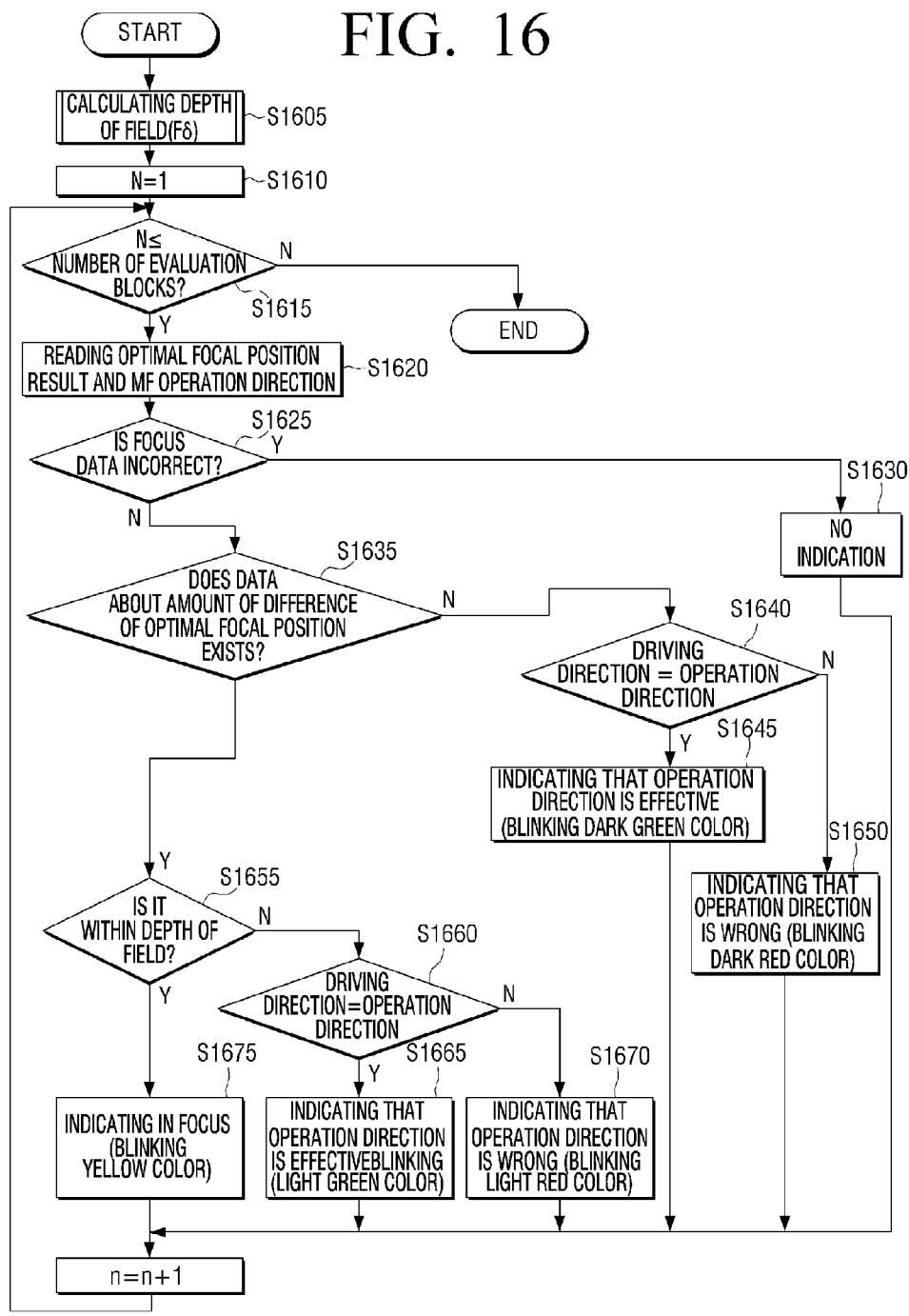
FIG. 16 is a flow chart illustrating an indicating operation when there is user's focus operation in the driving method of FIG. 9.

FIG. 16 is a flow chart illustrating an indicating operation when there is a user's focus operation as determined in connection with the driving method of FIG. 9.

Referring to FIG. 16, the control unit calculates the depth of field Fδ at operation S1605.

The control unit sets the value of n as 1 at operation S1610, and evaluates whether n is less than the number of evaluation blocks at operation S1615.

If it is determined that n is larger than the number of evaluation blocks at operation S1615-N, the control unit terminates the indication operation of FIG. 16.

If it is determined that n is less than the number of evaluation blocks at operation S1615-Y, the control unit outputs the result of the optimal information, and detects the MF operation direction at operation S1620.

The control unit determines whether data of the optimal information exists at operation S1625. If the determination result of operation S1625-Y is that the data of the optimal information does not exist, the control unit does not perform the indicating operation at operation S1630.

If it is determined at operation S1625-N that the data of the optimal information exists, the control unit determines whether data about the amount of difference of the optimal focal position exists at operation S1635.

If the data about the amount of difference of the optimal focal position does not exist at operation S1635-N, the control unit determines whether the user's operation direction is the calculated driving direction at operation S1640, and, if it is determined that the user's operation direction coincides with the calculated driving direction at operation S1640-Y, the control unit can indicate that the operation direction is effective at operation S1645. For example, a dark green color may indicate that the operation direction is effective.

If it is determined at operation S1640-N that the user's operation direction does not coincide with the calculated driving direction, the control unit can indicate that the operation direction is wrong and/or incorrect at operation S1650. For example, a dark red color can indicate that the operation direction is incorrect in that it does not coincide with the calculated driving direction.

If it is determined at operation S1635-Y that the amount of difference of the optimal focal position exists, the control unit determines whether the amount of difference of the optimal focal position is within the depth of field at operation S1655. If it is determined that the amount of difference is not within the depth of field at operation S1655-N, the control unit determines whether the user's operation direction is the calculated driving direction at operation S1660, and, if the user's operation direction coincides with the calculated driving direction at operation S1660-Y, the control unit can indicate that the operation direction is effective at operation S1665. For example, a light green color may indicate that the user's operation direction coincides with the calculated driving direction and is effective.

If it is determined at operation S1660-N that the user's operation direction does not coincide with the calculated driving direction, the control unit can indicate that the operation direction is wrong and/or incorrect at operation S1670. For example, a light red color may indicate that the user's operation direction does not coincide with the calculated driving direction, and thus the operation direction is incorrect.

If it is determined at S1655-Y that the data of the amount of difference is within the depth of field, the optimal focal position may be indicated at operation S1675. For example, a yellow color may blink to indicate that the optical focus position is obtained.

After color processing is performed about one block, the control unit increases the value of n by 1 at operation S1680, and can perform color processing about different blocks.

Although several embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image pickup apparatus comprising:
    an image pickup unit to photograph a subject by using a photographing device;
    a control unit to determine an operation mode of the image pickup apparatus, and, when the operation mode of the image pickup apparatus is a manual focusing mode, the control unit to select a focus detecting method to be applied among a plurality of focus detecting methods according to a size of a focus operation of a user;
    a determination unit to determine a focus state for the subject by using the selected focus detecting method; and
    a user interface unit to indicate the determined focus state.

2. The image pickup apparatus of claim 1, wherein the plurality of focus detecting methods include a wobbling operation method, and
    when there is no focus operation of the user or when the focus operation is less than or equal to a predetermined size, the control unit selects the wobbling operation method as the focus detecting method to be applied.

3. The image pickup apparatus of claim 2, wherein when the focus operation of the user exceeds the predetermined size, the control unit selects a manual focusing operation method as the focus operation of the user.

4. The image pickup apparatus of claim 2, wherein the determination unit converts a driving amplitude of the wobbling operation according to an aperture value and a focus state of a lens unit, and determines the focus state for the subject.

5. The image pickup apparatus of claim 2, wherein
    when a zoom lens is driven, the control unit controls the determination unit so as not to determine the focus state for the subject.

6. The image pickup apparatus of claim 5, wherein when the zoom lens is driven, the control unit controls the user interface unit so as not to indicate the determined focus state.

7. The image pickup apparatus of claim 1, wherein when a focus lens is stopped, the user interface unit indicates the determined focus state and a driving direction of the focus lens.

8. The image pickup apparatus of claim 1, wherein while a focus lens is being driven, the user interface unit indicates the determined focus state and a validity of a driving direction of the focus lens.

9. The image pickup apparatus of claim 1, wherein the determination unit calculates an optimal focal position according to focus information at three different positions of a focus lens, and calculates a driving direction of the focus lens to move to the calculated optimal focal position.

10. The image pickup apparatus of claim 1, further comprising:
    a storage unit to store images photographed by the image pickup unit,
    wherein when an image pickup command is input, the control unit stores the images photographed by the photographing device in the storage unit.

11. A driving control method of an image pickup apparatus comprising:
    determining an operation mode of the image pickup apparatus;
    if the operation mode of the image pickup apparatus is a manual focusing mode, selecting a focus detecting method to be applied among a plurality of focus detecting methods according to a size of a focus operation of a user;
    determining a focus state for a subject by using the selected focus detecting method; and
    indicating the determined focus state.

12. The driving control method of claim 11, wherein the plurality of focus detecting methods includes a wobbling operation method, and
    when there is no focus operation of the user or when the focus operation is less than or equal to a predetermined size, selecting the wobbling operation method as the focus detecting method to be applied.

13. The driving control method of claim 12, wherein when the focus operation of the user exceeds the predetermined size, the selecting a focus detecting method comprises selecting a manual focusing operation method according to the focus operation of the user.

14. The driving control method of claim 12, wherein the wobbling operation converts a driving amplitude thereof according to an aperture value and a focus state of a lens unit.

15. The driving control method of claim 12, wherein the determining the focus state comprises:
when a zoom lens is driven, determining that the determination of the focus state is not performed.

16. The driving control method of claim 15, wherein the indicating the determined focus state comprises:
when the zoom lens is driven, not indicating the determined focus state.

17. The driving control method of claim 11, wherein the indicating the determined focus state comprises:
when the focus lens is stopped, indicating the determined focus state and a driving direction of the focus lens.

18. The driving control method of claim 11, wherein the indicating the determined focus state comprises:
while a focus lens is being driven, indicating the determined focus state and a validity of a driving direction of the focus lens.

19. The driving control method of claim 11, wherein the determining a focus state comprises:
calculating an optimal focal position by using focus information at three different positions of a focus lens; and
calculating a driving direction of the focus lens to move to the calculated optimal focal position.

20. A non-transitory computer-readable recording medium, that, when executed by a computer, performs a driving control method of an image pickup apparatus, the driving control method comprising:
determining an operation mode of the image pickup apparatus;
if the operation mode of the image pickup apparatus is a manual focusing mode, selecting a focus detecting method to be applied among a plurality of focus detecting methods according to a size of a focus operation of a user;
determining a focus state for a subject by using the selected focus detecting method; and
indicating the determined focus state.

* * * * *